March 9, 1926.
J. B. LADD
BRICK HACKING
Filed Dec. 3, 1918   3 Sheets-Sheet 3
1,576,338
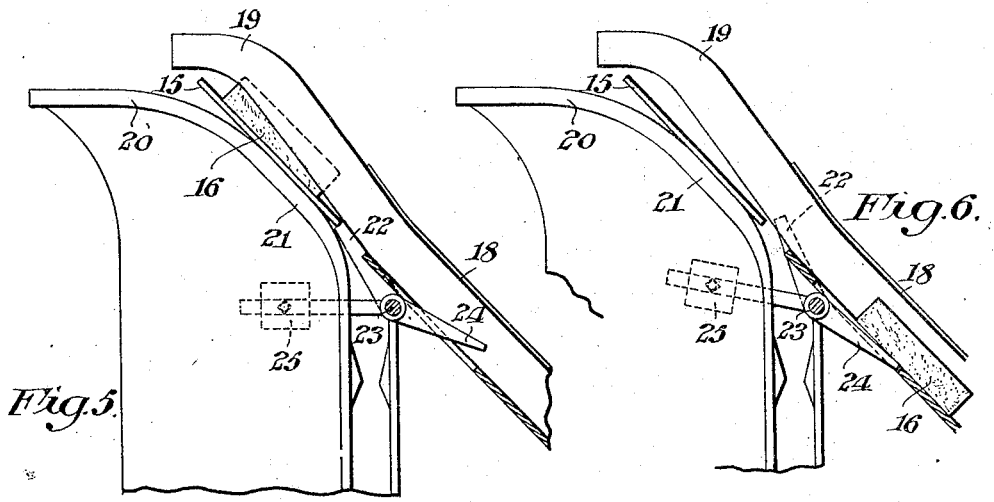
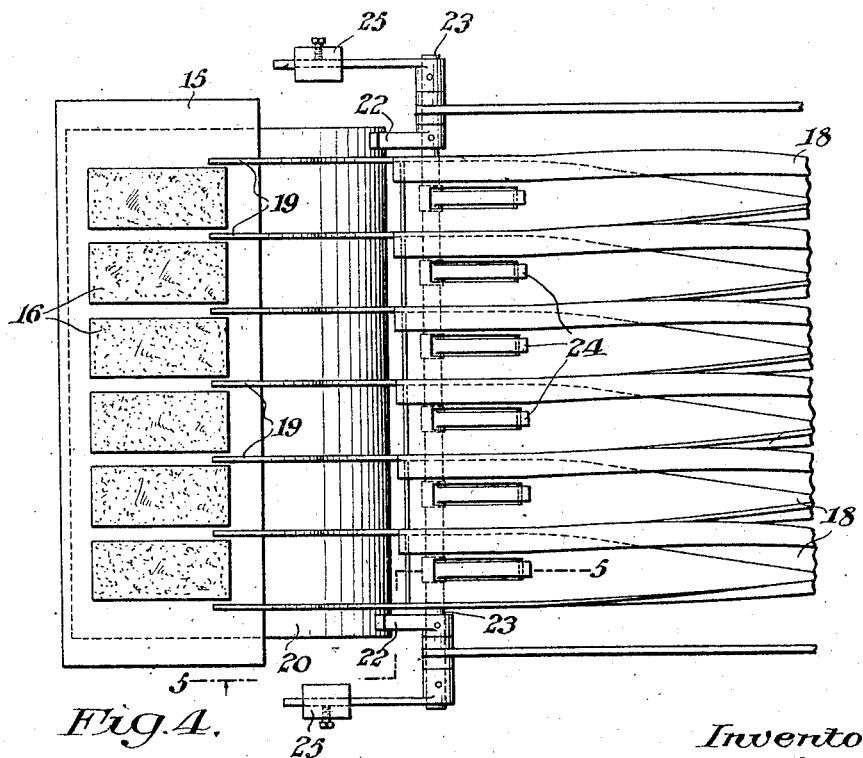

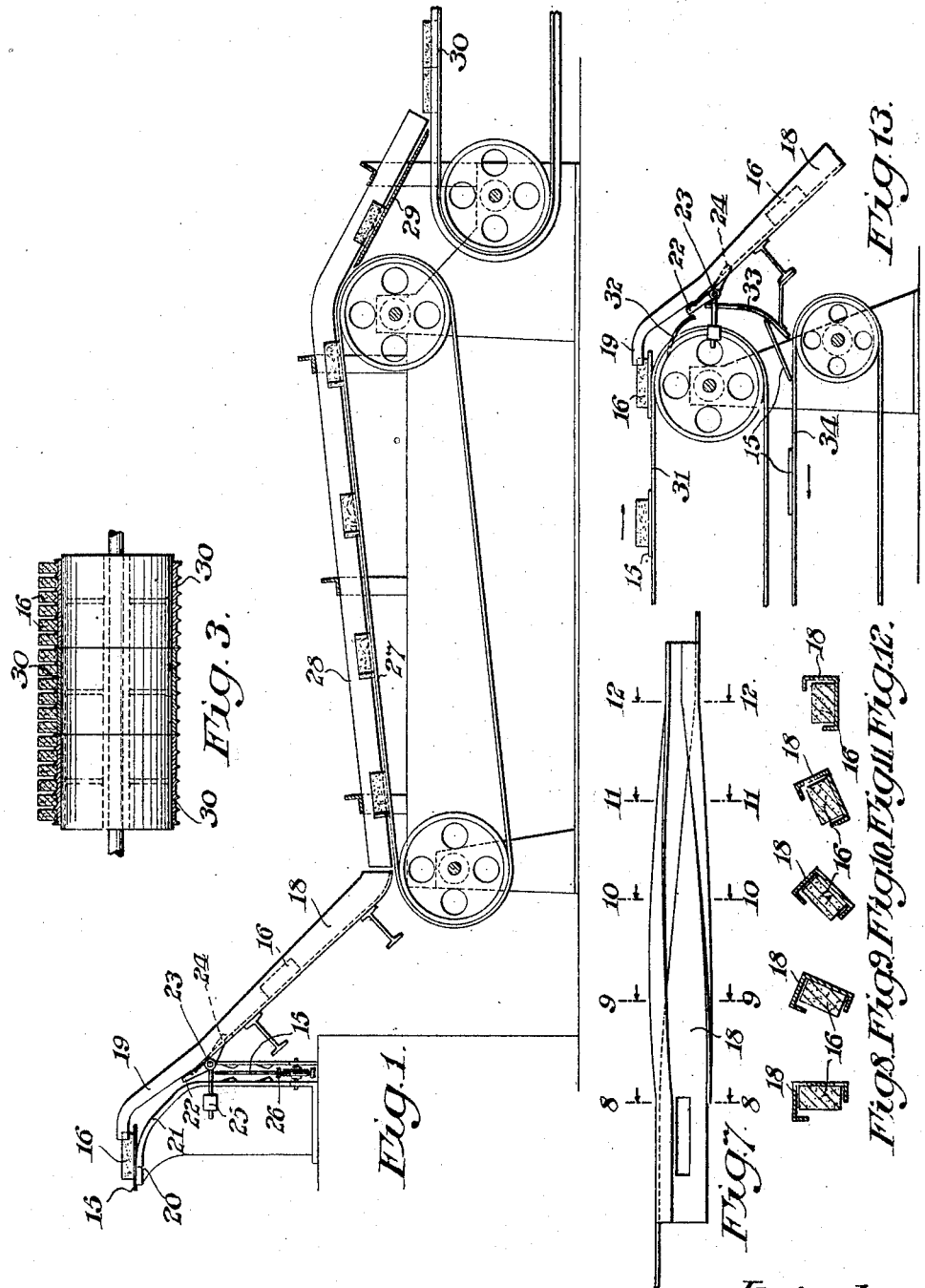

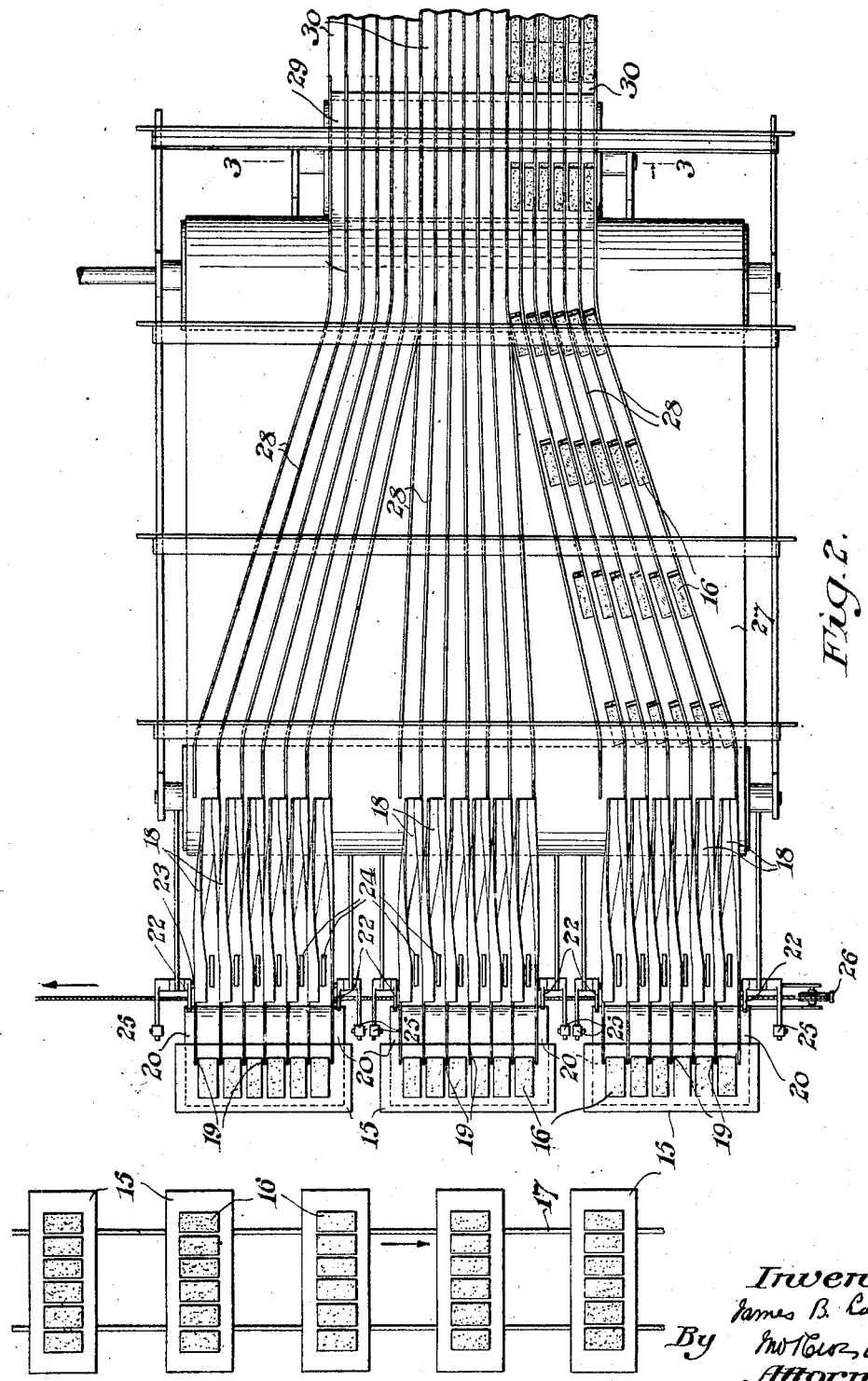

Patented Mar. 9, 1926.

1,576,338

UNITED STATES PATENT OFFICE.

JAMES B. LADD, OF ARDMORE, PENNSYLVANIA.

BRICK HACKING.

Application filed December 3, 1918. Serial No. 265,082.

*To all whom it may concern:*

Be it known that I, JAMES B. LADD, a citizen of the United States, residing at Ardmore, in the county of Montgomery, State of Pennsylvania, have invented new and useful Improvements in Brick Hacking, of which the following is a specification.

My invention relates to improvements in brick hacking. The object is to provide improved method and means for transferring pressed bricks from the pallets upon which they have come from the driers, to the hacking table or belts from which they are lifted and transferred to cars.

The invention also comprises the method and means for up-edging the bricks, that is turning them from the flat position which they occupy on the pallets, to the position on edge when delivered to the hacking table.

A method and means for lifting the bricks from the hacking tables or belts and transferring them to the cars is described in my co-pending application Serial No. 250,002, filed Aug. 15, 1918.

Referring to the drawings, which illustrate by way of example suitable means for effecting my invention—

Fig. 1 is a side elevation partly in section of means for transferring the bricks from the pallets to the hacking table and for turning the bricks up on to edge during transit.

Fig. 2 is a plan view of same also showing the pallets brought into convenient position by a suitable conveyor.

Fig. 3 is a section on line 3, 3 of Fig. 2.

Fig. 4 is a plan view on an enlarged scale of one end of the transfer mechanism with the pallets in delivery position.

Fig. 5 is a side elevation on an enlarged scale of a part of the structure shown in Fig. 1, showing the bricks ready to leave the pallet.

Fig. 6 is a similar view showing the bricks discharged from the pallet.

Fig. 7 is a plan view of the chute which turns the bricks up onto edge.

Fig. 8 is a section on line 8, 8 of Fig. 7.
Fig. 9 is a section on line 9, 9 of Fig. 7.
Fig. 10 is a section on line 10, 10 of Fig. 7.
Fig. 11 is a section on line 11, 11 of Fig. 7.
Fig. 12 is a section on line 12, 12 of Fig. 7.

Fig. 13 is a side elevation showing, as a modification, a conveyor for automatically delivering the pallets directly to the transfer mechanism.

Similar numerals refer to similar parts throughout the several views.

Referring especially to Figs. 1 and 2, the pallets 15, each shown as containing six bricks 16, are brought on the conveyor cables 17 to convenient position with respect to the receiving ends of the chutes 18. These chutes are provided with the upwardly projecting guides 19, between which the ends of the bricks are inserted while on the pallets. Each pallet is placed upon the supporting frame 20 having the inclined formation 21. The pallet is adapted to slide down this inclined formation until it engages the stop pawls 22, mounted on shaft 23 as shown in Fig. 5. When the pallet is brought to rest by engaging pawls 22 the bricks leave the pallet and pass over and depress the levers 24 also mounted on shaft 23 thereby lifting pawls 22 to permit the empty pallet to pass down to a suitable conveyor 26, see Figs. 1 and 2, by which it is returned for reloading. Shaft 23 is also provided with the counterbalances 25 for maintaining the pawls 22, for engaging the pallet.

The chute 18 normally in the position shown in Figs. 1 and 5 is of sufficient inclination to assure the downward passage by gravity of the bricks to the conveyor belt 27, at the discharge end thereof. This chute is of spiral formation having a quarter turn from its receiving end to its delivery end. This is clearly indicated in Figs. 7 to 12. The purpose of this formation is to turn the bricks from the flat position in which they are delivered from the pallet to the chute, up onto edge when delivering to the conveyor belt 27.

It will be noted that my device shows by way of example, the machine adapted to receive pallets at three points simultaneously (see Fig. 2). All of the chutes deliver the bricks to the wide conveyor belt 27. Over this belt 27 are positioned the guides 28 forming converging channels for bringing the bricks in equally spaced parallel rows to the inclined shelf 29 which delivers to the hacking table formed by the belts 30.

These hacking belts 30 are three in number, each driven by an independently controlled variable speed motor, not shown.

Where the pallets are transferred by hand from conveyor 17, to the chutes 18, there may be some irregularity in such delivery, and therefore the feed of the bricks to the several hacking belts may not be uniform. For this reason it is desirable to control these several belts independently in order to insure the butting up of the bricks on each hacking belt.

In Fig. 13 is shown a modification, in which the pallets are delivered to the chutes by a conveyor 31. The guides 32 and 33 are provided for guiding the discharged pallets, when released by the stop pawls 22, to the conveyor 34 which returns the pallets for recharging. When this form of device is employed for delivering the pallets to the chutes the delivery of the pallets at the three or more points, as the case may be, is substantially simultaneous or uniform, and with such an arrangement there will be no need of having different hacking belts with independent drives, but a single wide hacking belt may be used.

*The operation.*

In accordance with the arrangement shown in Figs. 1, 2 and 3 three men are employed to lift the pallets from the conveyor 17 and place them upon the supporting frame 20 with the bricks inserted slightly between the guides 19, when they are released by the operators the pallets slide down the inclined formation 21 until arrested by encountering the stop pawls 22. The bricks then slide from the pallets down the chutes 18, at the same time releasing the empty pallets as above described, and, due to the formation of the chutes, are turned from the flat position a quarter turn up on to edge and are thus delivered on to the wide conveyor belt 27 between the guides 28. The bricks are thus guided in convergent streams and are delivered in equally spaced parallel rows on to the hacking belts. Each of the three hacking belts is driven by an independent variable speed motor controlled by an operator who regulates the speed of each belt so that the bricks coming on to it will all be butted up close, end to end when its full charge has been received.

As above stated the purpose of using three hacking belts and independent variable speed drives is to provide for irregularities in the rate of delivery of the pallets to the machine, when they are delivered by hand.

The number of bricks delivered on to the hacking table is, of course, in proportion to the number of pallets delivered to the machine, and in practice the delivery of pallets to the machine is stopped when the predetermined number of pallets have delivered bricks sufficient to fill the hacking belts.

For continuous operation I use two complete hacking mechanisms as above described and feed the bricks to one hacking table until it is filled, and then feed to the other while the hacking table first filled is being unloaded on to cars, in the manner such for example as described in my copending application Serial No. 250,002.

The primary purpose of the invention is to take bricks from pallets and deliver them, accurately spaced and tiered, on to cars, from which cars they are stacked into kilns, preferably by power operated stacking machines.

In that the bricks necessarily rest on their flats on the pallets, and must necessarily rest on their edge when tiered on the cars, the means for up-edging the bricks is an important feature.

What I claim is:—

1. The method of hacking bricks which consists in transferring the bricks from the pallets, upon which they come from the driers, to a hacking table, part of said movement being caused by gravity, and up-edging the bricks during the gravity movement.

2. The method defined in claim 1, in which the bricks are delivered to the hacking table in equally spaced parallel rows.

3. The method defined in claim 1 in which the bricks are delivered to the hacking table in equally spaced parallel rows and the bricks of each row are all butted up close end to end.

4. In a hacking machine the combination of a plurality of pallets and pallet conveyers, means for automatically separating the bricks from the pallets and diverting the bricks and the pallets into different paths of travel and means for up-edging the bricks during the transfer from the pallet to the hacking table.

5. In a hacking machine the combination of a plurality of pallets and pallet conveyers, means for automatically separating the bricks from the pallets and diverting the bricks and pallets into different paths of travel and means for securing the bricks of each row butted up close end to end throughout the row on the hacking table.

6. In a hacking machine the combination of a plurality of pallets and pallet conveyers, means for automatically separating the bricks and the pallets and diverting the bricks and pallets into different paths of travel and means for automatically delivering pallets of bricks to the separating mechanism at different points with substantial uniformity.

7. In a brick hacking machine the combination of a hacking table, a plurality of chutes having a spiral formation for up-edging the bricks passing therethrough, means for guiding the bricks from the pallets to the chutes means for separating the bricks from the pallets, means controlled by the bricks for releasing the discharged pallets, a conveyor to receive the bricks from the chutes, guides cooperating there-with for delivering the bricks in parallel rows to the hacking table.

8. The hacking machine defined in claim 7 in which stop pawls are provided to arrest the pallets in an inclined position to discharge the bricks, and levers are provided operated by the discharged bricks for operating the pawls to release the pallets.

9. The hacking machine defined in claim 7, in which the hacking table comprises a plurality of independently driven conveyor belts.

JAMES B. LADD.